United States Patent [19]

Suzuki

[11] Patent Number: 4,916,982
[45] Date of Patent: Apr. 17, 1990

[54] IMPROVEMENTS IN CONTROLS RELATING TO ENGINE BRAKING IN A CONTINUOUSLY VARIABLE TRANSMISSION

[75] Inventor: Yutaka Suzuki, Hadano, Japan

[73] Assignee: Nissan Motor Co., Ltd., Yokohama, Japan

[21] Appl. No.: 288,146

[22] Filed: Dec. 22, 1988

[30] Foreign Application Priority Data

Dec. 24, 1987 [JP] Japan .................................. 62-327888

[51] Int. Cl.$^4$ ............................ F16H 7/14; F16H 9/16
[52] U.S. Cl. ........................................ 74/866; 74/867; 74/868; 474/28
[58] Field of Search ................. 74/866, 867, 868, 689, 74/740; 474/18, 28

[56] References Cited

U.S. PATENT DOCUMENTS

| 4,494,942 | 1/1985 | Hirano et al. | 474/28 |
| 4,552,545 | 11/1985 | Koivunen | 474/28 X |
| 4,575,364 | 3/1986 | Lamers | 474/28 X |
| 4,730,522 | 3/1988 | Morimoto | 74/868 |
| 4,735,113 | 4/1988 | Yamamuro et al. | 74/866 |
| 4,784,021 | 11/1988 | Morimoto | 74/868 |

FOREIGN PATENT DOCUMENTS

61-105353  5/1986  Japan .

Primary Examiner—Leslie A. Braun
Assistant Examiner—Khoi Q. Ta
Attorney, Agent, or Firm—Foley & Lardner, Schwartz, Jeffery, Schwaab, Mack, Blumenthal & Evans

[57] ABSTRACT

A continuously variable transmission comprises a V-belt tensioned between a driver pulley and a follower pulley. Hydraulic fluid pressure that determines a gripping force which the driver pulley grips the V-belt with is reduced upon detecting a demand for engine brake running of a motor vehicle, whereby a good engine brake feel is assured during transient period to the engine brake running.

7 Claims, 6 Drawing Sheets

IMPROVEMENTS IN CONTROLS RELATING TO ENGINE BRAKING IN A CONTINUOUSLY VARIABLE TRANSMISSION

BACKGROUND OF THE INVENTION

The present invention relates to a ratio control system for a continuously variable transmission.

There is known a ratio control system for a continuously variable transmission. Such a ratio control system is disclosed in JP 61-105353. Similar ratio control system is disclosed in U.S. Pat. No. 4,735,113 issued to Yamamuro et al.

Such a continuously variable transmission comprises a V-belt type continuously variable transmission mechanism wherein varying hydraulic pressure supplied to a driver pulley cylinder chamber causes a variation in radius of a running diameter where a V-belt contacts with the driver pulley, thus inducing a variation in a transmission ratio. The hydraulic pressure is adjusted by an electro-hydraulic module including an electronic ratio control unit and a hydraulic control system. The ratio control unit is supplied with various kinds of input information and determines the content of intructions to be supplied to an actuator in response to such various kinds of input information. An output signal of the electronic control unit is supplied to the actuator in the form of a stepper motor for controlling a shift control valve. The shift control valve forms a part of the hydraulic pressure control system and regulates fluid supply to and fluid discharge from the driver pulley cylinder chamber to adjust a hydraulic pressure therein to a value corresponding to a position which the stepper motor takes. The shift control valve does not effect any regulation of hydraulic pressure supplied to a follower pulley cylinder from a line pressure regulator valve. Thus, a line pressure generated by the line pressure regulator valve is kept supplied to the follower pulley cylinder. In the manner mentioned above, a transmission ratio is continuously varied to an appropriate value most suitable for vehicle conditions and running conditions.

However, with the known ratio control system, the transmission cannot downshift at a speed high enough during a transition from an engine drive running state to an engine brake running state. This is because according to this ratio control system, the hydraulic pressure in the driver pulley cylinder is adjusted in accordance with the same ratio shift control maneuver in the engine brake running state as in the engine drive running state. The engine brake running state is initiated when a manual lever is placed at a low range or when the engine begins to be driven by the traction wheels after the accelerator pedal is released. Owing to a considerable slow speed at which the ratio changes, there is a considerable delay until the longitudinal deceleration and the engine speed incline take place, degrading engine brake feel.

That is, in the V-belt type continuously variable transmission mechanism, the relationship between a gripping force which the driver pulley grips the V-belt and a gripping force which the follower pulley grips the V-belt with is a function of transmission ratio and input torque. The relationship is such that the driver pulley needs a gripping force which becomes high as the input torque (in the engine revolution direction) increases and the transmission ratio becomes high.

On the contrary, during engine brake running, the pulley revoltion speed increases at the same time when the input torque increases in the negative direction. Even though the driver pulley requires a less gripping force during engine brake running than during engine drive running, the gripping force which the driver pulley grips the V-belt with becomes stronger than necessary. This is because hydraulic pressure in the driver pulley cylinder is increased due to centrifugal force which the driver pulley is subject to and thus becomes higher than necessary. Therefore, if the hydraulic pressure in the driver pulley is controlled in accordance with the same transient control maneuver during the transient period into the engine drive running, a speed at which the transmission ratio changes in such a direction as to increase the reduction ratio becomes very slow.

An object of the present invention is to provide a continuously variable transmission wherein a good engine brake feel is provided during transient period from engine drive running state to engine brake running state.

SUMMARY OF THE INVENTION

According to the present invention, a continuously variable transmission comprises a V-belt tensioned between a driver pulley and a follower pulley, wherein hydraulic fluid pressure that determines a gripping force which the driver pulley grips the V-belt with is reduced upon detecting a demand for engine brake running of a motor vehicle, whereby a good engine brake feel is assured during transient period to the engine brake running.

More specifically, there is provided a continuously variable transmission for a motor vehicle with an engine, comprising:

a driver pulley shaft;

a follower pulley shaft arranged in parallel to said driver pulley shaft;

a driver pulley rotatable with said driver pulley shaft, said driver pulley including a first conical pulley part rotatable with said driver pulley shaft, and a second axially movable conical pulley part defining with said first conical pulley part a first pulley groove, said driver pulley including a driver pulley cylinder chamber, said second axially movable conical pulley part being displaceable in response to hydraulic fluid pressure within said driver pulley cylinder chamber toward said first conical pulley part;

a follower pulley rotatable with said follower pulley shaft, said follower pulley including a third conical pulley part rotatable with said follower pulley shaft, and a fourth axially movable conical pulley part defining with said third conical pulley part a second pulley groove, said follower pulley including a follower pulley cylinder chamber, said fourth axially movable conical pulley part being displaceable in response at least to hydraulic fluid pressure within said follower pulley cylinder chamber toward said third conical pulley part;

a V-belt extending through said first and second pulley grooves and tensioned between said driver and follower pulleys;

said first and second conical pulley parts interposing therebetween said V-belt with a gripping force determined by the hydraulic fluid pressure within said driver pulley cylinder chamber;

an actuator;

means for regulating hydraulic fluid pressure in said driver pulley cylinder chamber in response to a position taken by said actuator, thereby to vary a ratio between said driver and follower pulleys;

means for detecting various kinds of input information and generating output signals indicative of said various kinds of input information;

means receiving said output signals for adjusting the magnitude of said gripping force in response to said output signals of said detecting means, said adjusting means including means for activating said actuator in response to said output signals, means for detecting a demand for an engine brake running of the motor vehicle, and means for effecting a reduction in magnitude of said gripping force upon detecting said demand for the engine brake running of the motor vehicle.

DETAILED DESCRIPTION OF THE INVENTION

Hereinafter, embodiments according to the present invention are explained in connection with the accompanying drawings.

Figure 1:
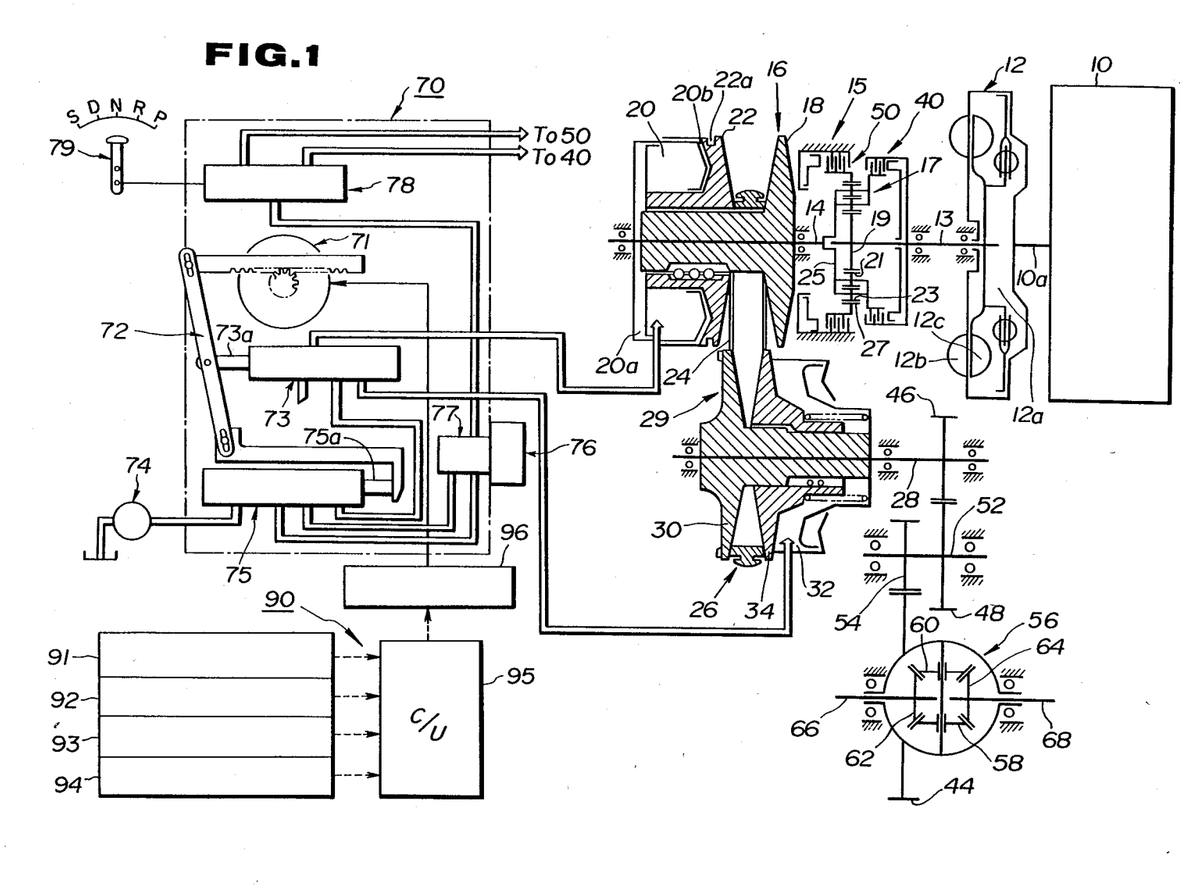
FIG. 1 is an overall view of a ratio control system for a continuously variable transmission, showing a first embodiment according to the present invention.

Referring to FIG. 1, the first embodiment is described. In FIG. 1, the reference numeral 10 designates an engine with an output shaft 10a of an automotive vehicle. The output shaft 10a is drivingly connected to a continuously variable transmission which generally comprises a fluid coupling 12, a forward reverse selector mechanism 15, a V-belt type continuously variable transmission mechanism 29, and a differential 56.

The fluid coupling 12 includes a pump impeller 12b connected to the engine output shaft 10a and a turbine runner 12c connected to a turbine shaft 13. It also includes a lock-up mechanism which is engaged in response to an absence of hydraulic pressure within a lock-up chamber 12a thereby to mechanically interconnect the pump impeller 12b and the turbine runner 12c.

The forward reverse selector mechanism 15 includes a planetary gear set 17, a forward clutch 40 and a reverse braking 50. The planetary gear set 17 includes a sun gear 19, a pinion carrier 25 rotatably carrying dual pinions 21 and 23, and a ring gear 27. The sun gear 19 is connected to the turbine shaft 13. The pinion carrier 25 is connectable via the forward clutch 40 to the turbine shaft 13, and it is connected to a driver pulley shaft 14. The ring gear 27 is adapted to be held stationary, to a stationary portion via the reverse braking clutch 50.

The V-belt type continuously variable transmission mechanism 29 includes a driver pulley rotatable with the driver pulley shaft 14, a follower pulley 26 rotatable with a follower shaft 28, and a V-belt 24 tensioned between the driver pulley 16 and the follower pulley 26. The driver pulley 16 includes a conical pulley part 18 integral with the driver pulley shaft 14 for unitary rotation, and an axially movable conical pulley part 22. The movable conical pulley part 22 cooperates with the other conical pulley part 18 to define therebetween a V-shaped pulley groove. The movable conical pulley part 22 is axially displaceable along the driver pulley shaft 14 in response to hydraulic fluid pressure acting in a driver pulley cylinder chamber 20. The driver pulley cylinder chamber 20 includes two chambers 20a and 20b, and defines an effective pressure acting area two times as much as that defined by a follower pulley cylinder chamber 32. The follower pulley 26 includes a conical pulley part 30 integral with the follower shaft 28 for rotation therewith, and an axially movable conical pulley part 34. The movable conical pulley part 34 cooperates with the conical part 30 to define therebetween a V-shaped pulley groove. The movable conical pulley part 34 is axially displaceable along the follower pulley shaft 34 in response to hydraulic pressure in the follower pulley cylinder chamber 32.

The follower shaft 28 has fixed thereto a drive gear 46 which meshes with an idler gear 48 fixed to the idler gear shaft 52. The idler gear shaft 52 has fixed thereto a pinion gear 54 which meshes with a final gear 44 of the differential 56.

The differential 56 includes a pair of pinions integrally rotatable with the final gear 44, and a pair of side gears 62 and 64. The side gears 62 and 64 are fixedly coupled with a pair of axle output shafts 66 and 68.

The manner of ratio change in the V-belt type continuously variable transmission is briefly described.

The change in transmission ratio in the V-belt type continuously variable transmission can be effected by axially displacing the movable conical pulley parts 22 and 34 to vary their running diameters with the V-belt 24. Hydraulic pressure within the driver pulley cylinder chamber 20 is varied in relation to hydraulic pressure within the follower pulley cylinder chamber 32 in accordance with a control command. For example, increasing the width of the V-shaped pulley groove of the driver pulley 16 causes the V-belt 24 to decrease the width of the V-shaped pulley groove of the follower pulley 26, changing the transmission ratio in a downshift direction, thus causing a reduction in revolution speed of the follower pulley shaft 28. On the contrary, decreasing the width of the V-shaped pulley groove of the driver pulley 16 causes the V-belt 24 to increase the width of the V-shaped pulley groove of the follower pulley 26.

Hereinafter, the ratio control system is described.

As shown in FIG. 1, the ratio control system comprises a hydraulic ratio control portion 70, and an electronic ratio control portion 90 which drives a stepper motor 71 of the hydraulic ratio control portion 70. The hydraulic ratio control portion 70 regulates fluid supply to the driver pulley cylinder chamber 20 and fluid discharge therefrom, while it admits line pressure to the follower pulley cylinder chamber 32.

The hydraulic ratio control portion 70 comprises the stepper motor 71, a link mechanism 72, a ratio control valve 73, an oil pump 74, a line pressure regulator valve 75, a vacuum diaphragm 76, a throttle valve 77, and a manual valve 78.

The stepper motor 71 actuates via the link mechanism 72 spools 73a and 75a of the ratio control valve 73 and line pressure regulator valve 75.

The ratio control valve 73 includes a spool 73a which is operatively linked to the link mechanism 72. The arrangement is such that, when the spool 73a is displaced to the left as viewed in FIG. 1, supply of hydraulic fluid to the driver pulley cylinder chamber 20 is increased, while discharge of hydraulic fluid from the driver pulley cylinder chamber 20 is decreased, causing an increase in hydraulic fluid pressure within the driver pulley cylinder chamber 20.

The line pressure regulator valve 75 effects pressure regulation on hydraulic fluid from the oil pump 74 and generates the line pressure variable in response to throttle opening degree and transmission ratio.

The throttle valve 77 effects pressure regulation under the influence of the vacuum diaphragm 76 and generates a throttle pressure in response to engine intake manifold vacuum.

The manual valve 78 is a selector valve operated by a select lever 79. Upon selecting one of forward drive ranges including a D range (a drive range) and a S range (a sports range), the manual valve 78 admits the throttle pressure to the forward clutch 40. Upon selecting a R range (a reverse range), the manual valve 78 admits the throttle pressure to the reverse braking clutch 50.

The S range is different from the D range in that, with the same vehicle speed and throttle opening degree, a smaller transmission ratio is provided in the S range than a transmission ratio provided in the D range.

The electronic ratio control portion 90 includes a select position sensor 91, a driver or input pulley revolution speed sensor 92, a vehicle speed sensor 93, a throttle opening degree sensor 94, a control unit 95, and a stepper motor driver circuit 96.

The select position sensor 91 detects which range position is selected by the select lever 79. Thus, an output of the select position sensor 91 is indicative of the position $S_P$ selected by the select lever 79.

The input pulley revolution speed sensor 92 detects revolution speed of the driver pulley 16 and generates an output signal indicative of the driver pulley revolution speed $N_{IN}$ detected.

The vehicle speed sensor 93 detects revolution speed of the follower pulley 26 or that of the axle shaft 66 or 68 and generates an output signal indicative of vehicle speed $V_{SP}$.

The throttle opening degree sensor 94 detects opening degree of the engine throttle valve and generates an output signal indicative of the throttle opening degree $T_{VO}$ detected.

The control unit 95 is a microcomputer based control system including a CPU (a central processor unit), a RAM (a random access memory), a ROM (a read only memory), and an input output interface. The output signals of the sensors 91, 92, 93, and 94 are supplied to the control unit 95. An output signal of the control unit 95 is supplied to the motor driver circuit 96 for the stepper motor 70.

The hydraulic ratio control portion 70 and electronic ratio control portion 90 may be fully understood when reference is made to U.S. Pat. No. 4,735,113 which is incorporated herein by reference in its entirety or JP 61-105353.

The operation of the first embodiment is described.

Figure 2:
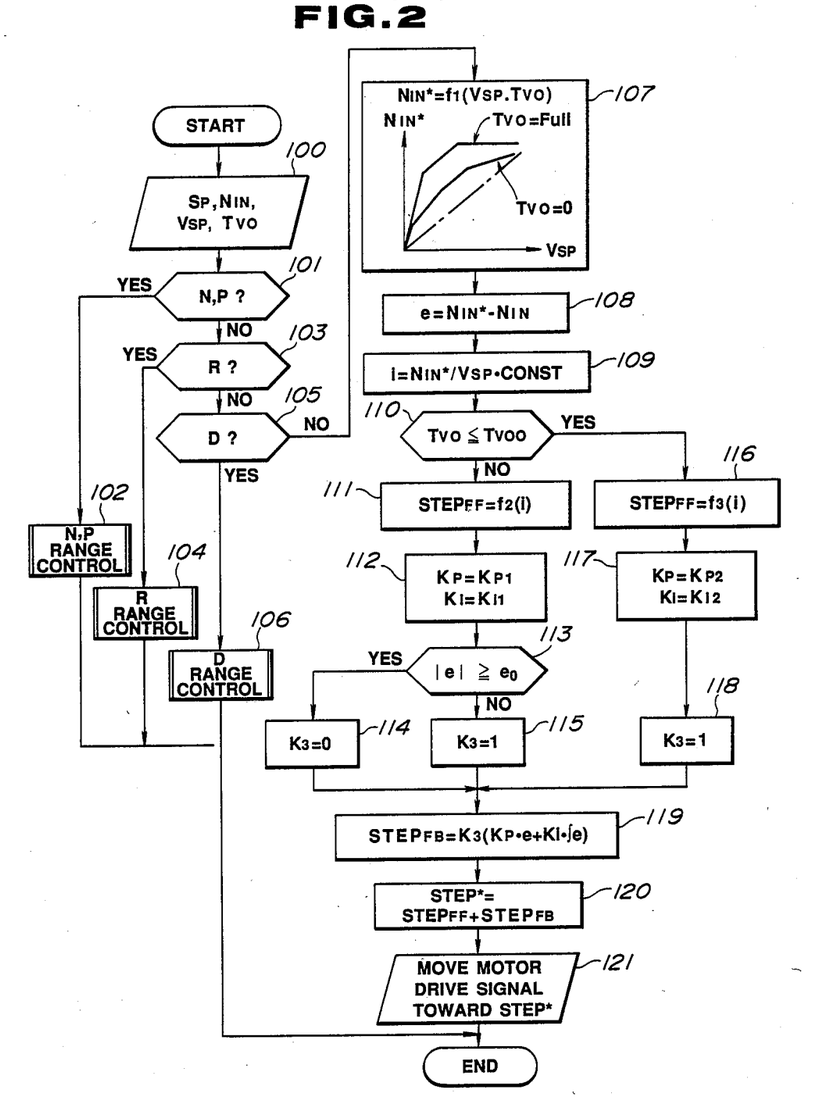
FIG. 2 a flowchart illustrating processing jobs executed in a control unit of the first embodiment.

The control unit 95 stores in its ROM a control program as illustrated by a flowchart shown in FIG. 2. The execution of this control program is repeated upon expiration of a predetermined period of time.

At a step 100, the select position $S_P$, driver pulley revolution speed $N_{IN}$, vehicle speed $V_{SP}$, and throttle opening degree $T_{VO}$ are obtained by read-in operation from the output signals of the sensors 91, 92, 93, and 94.

At a step 101, a judgement is made whether the select position $S_P$ indicates one of the N range and P range or not. If it is judged that the N range or P range is indicated, the control proceeds to a step 102. At the step 102, a N, P range control is executed where the hydraulic fluid of the driver pulley cylinder chamber 20 is drained.

If the answer to the enquiry at the step 101 is NO, the control proceeds to a step 103 where it is judged whether the select position $S_P$ is indicative of the R range or not. If it is judged that the R range is selected, the control proceeds to a step 104. At the step 104, a R range control is executed where hydraulic pressure within the driver pulley cylinder chamber 20 is kept at a predetermined value.

If the answer to the enquiry made at the step 103 is NO, the control proceeds to a step 105 where it is judged whether the select position $S_P$ is indicative of the D range or not. If it is judged that the D range is selected, the control proceeds to a step 106. At the step 106, a D range control is executed where hydraulic fluid pressure supplied to the driver pulley cylinder chamber 20 is adjusted to provide a transmission ratio suitable for vehicle conditions and running conditions.

If the answer to the enquiry made at the step 105 is NO, that is, if the S range is selected, a S range control which is hereinafter described is executed.

In this case, the control proceeds from the step 105 to a step 107. At the step 107, a target driver pulley revolution speed $N_{IN}^*$ is given using the vehicle speed $V_{SP}$ and throttle opening degree $T_{VO}$ obtained at the step 100 using the following general equation which is expressed as follows:

$$N_{IN}^* = f_1(V_{SP}, T_{VO}).$$

This function is visualized by the fully drawn curves in the chart shown in the block designated by the reference numeral 107. In this chart, one dot chain line represents target driver pulley revolution speed values versus various values of vehicle speed when $T_{VO}=0$ in the D range. It will be noted from the fully drawn line indicated by $T_{VO}=0$ that with the same vehicle speed when $T_{VO}$ is zero, a higher target pulley revolution speed value is given in the than a target pulley revolution speed value given in the D range.

Then, the control proceeds to a step 108 where using the target driver pulley revolution speed $N_{IN}^*$ obtained at the step 107 and the driver pulley revolution speed $N_{IN}$ obtained at the step 100, a deviation e is given from the qeuation as follows:

$$e = N_{IN}^* - N_{IN}.$$

At the subsequent step 109, a target ratio i is given by the equation as follows:

$$i = N_{IN}^* / \text{CONST} \quad (\text{CONST: constant}).$$

At the next step 110, the throttle opening degree $T_{VO}$ is compared with a predetermined throttle opening degree value $T_{VOO}$ that is indicative of a throttle opening degree near zero, and it is judged whether $T_{VO}$ is less than or equal to $T_{VOO}$ or not. It is judged at this step 110 whether the vehicle is in engine drive running state or engine brake running state.

Following the step 110, a motor drive control for the stepper motor 71 is executed in two different manners depending on the engine drive running state and the engine brake running state. This motor drive control combines a feedforward control with a feedback control.

During the engine drive running state when the answer to the enquiry made at the step 110 is NO, the control proceeds to a step 111. At the step 111, a target feedforward step $STEP_{FF}$ is given from the ratio i obtained at the step 109 using a function as illustrated in a chart shown in FIG. 3. Then, the control proceeds to a step 112 where two values $K_{p1}$ and $K_{p2}$ are set as two feedforward constants $K_p$ and $K_i$, respectively. At the next step 113, the absolute value of e, viz., $|e|$, is given and it is judged whether $|e|$ is greater than or equal to a predetermined deviation value $e_0$. If $|e|$ is greater than or equal to $e_0$, the control proceeds to a step 114 where zero is set as a constant $K_3$. If $|e|$ is less than $e_0$, the control proceeds to a step 115, one is set as the constant $K_3$.

Figure 3:
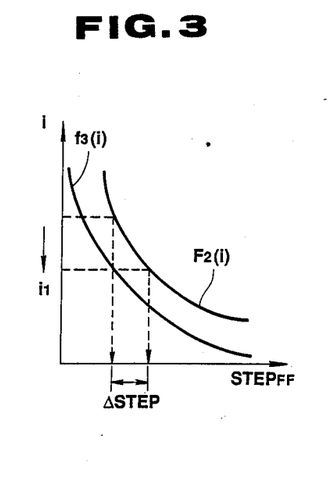
FIG. 3 is a chart showing a transmission ratio (i) versus a feedforward target position (STEP$_{FF}$) characteristic curve $f_2(i)$ used during engine drive running in comparison with a similar curve $f_3(i)$ used during engine brake running.

During the engine brake running state when the answer to the enquiry at the step 110 is YES, the control proceeds to a step 116 where the target feedforward position $STEP_{FF}$ is given by the ratio i obtained at the step 109 using the function $f_3$ shown in FIG. 3. Then, the control proceeds to a step 117 where two values $K_{p1}$ and $K_{p2}$ are set as the feedforward constants $K_p$ and $K_i$. $K_{p1}$ is less than $K_{p2}$, while $K_{i1}$ is less than $K_{i2}$. At the next step 118, one is set as the constant $K_3$.

After the step 114 or 115 or 118, the control proceeds to a step 119 where a target feedback position $STEP_{FB}$ is given by the constants $K_p$, $K_i$ and $K_3$, and the deviation e using the following equation:

$$STEP_{FB} = K_3(K_p \cdot e + K_i \cdot \int e).$$

Then, the control proceeds to a step 120, a target stepper motor position $STEP_{FF}$ is given by adding the target feedforward position $STEP_{FF}$ to the target feedback position $STEP_{FB}$. Finally, at a step 121, a stepper motor drive signal is moved in such a direction as to reduce a difference between an actual stepper motor position and the target stepper motor drive position $STEP^*$ toward zero. The stepper motor drive signal is supplied to the motor driver circuit 96. After repeating the execution of this flowchart, the actual position of the stepper motor 71 is adjusted to the target stepper motor position $STEP^*$.

Hereinafter, the manner of ratio control effected during running of the vehicle with the S range selected is described.

(A) During engine drive running:

During engine drive running with the S range being selected, the control proceeds from the step 110 to the step 119 via the steps 111, 112, 113 and 115 (or 114). In this process, since the feedforward constants $K_p$ and $K_i$ are set equal to the appropriate values $K_{p1}$ and $K_{i1}$ suitable for the running with the S range, effecting a ratio control featuring a quick response to an external disturbance. When the absolute value of deviation $|e|$ is greater than the predetermined deviation value $e_0$, the target feedback stepper motor position $STEP_{FB}$ is set equal to zero since the constant $K_3$ is zero (see step 114).

(B) During engine brake running:

During engine brake running with the S range selected, the control proceeds from the step 110 to the step 119 through the steps 116, 117, and 118. As will be readily understood from comparing the characteristic curve $f_3(i)$ with the characteristic curve $f_2(i)$, with the same ratio i obtained at the step 109, the target feedforward position $STEP_{FF}$ given at the step 116 is less than that given at the step 111. Thus, there is set a smaller transmission ratio providing a larger reduction ratio. At the step 119, since the larger values $K_{p2}$ and $K_{i2}$ are set as the feedback constants $K_p$ and $K_i$, a larger target feedback position $STEP_{FB}$ is set at the step 119.

Thus, the stepper motor 71 is activated at an increased speed so as to cause a quick drop in hydraulic pressure within the driver pulley cylinder chamber 20. As a result, an increase in hydraulic presure due to centrifugal force effect is offset by the above-mentioned quick drop in hydraulic pressure, assuring a sufficiently quick ratio change during transient period into engine brake running. Therefore, there is provided a preferred engine brake feel resulting from the occurrence of longitudinal deceleration at the initial stage and a quick increase in engine revolution speed.

Figure 4:
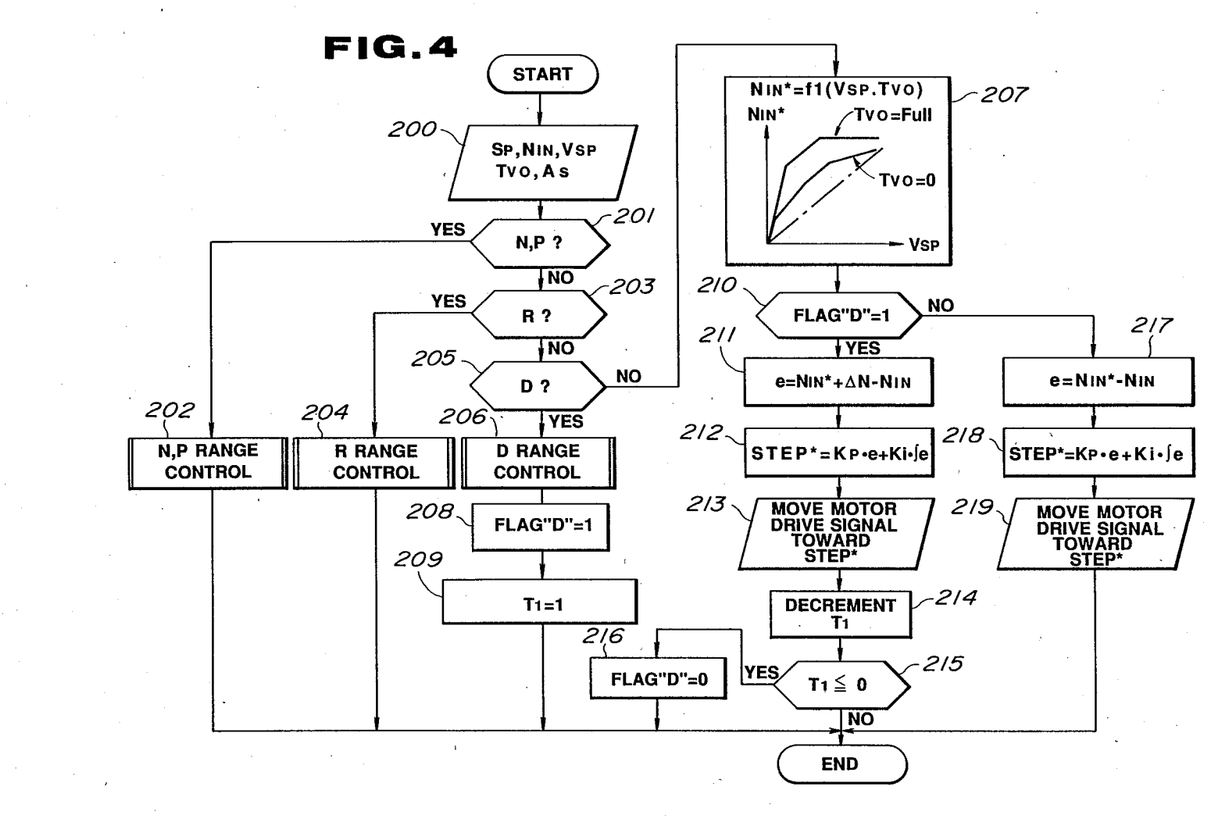
FIG. 4 is a flowchart illustrating processing jobs executed in a control unit of the second embodiment.
Figure 5:
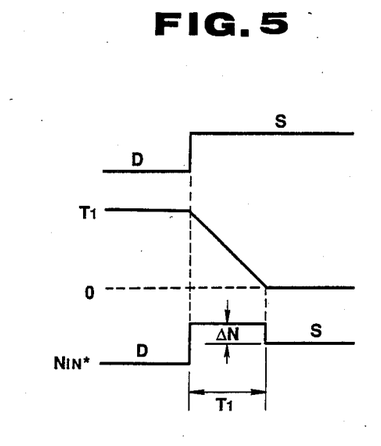
FIG. 5 is a time chart of a control during engine brake running.

Referring to FIGS. 4 and 5, the second embodiment is described.

This second embodiment is different from the first embodiment in that the initiation of engine brake running is detected by sensing a selection from the D range to the S range and a relatively high target driver pulley revolution speed $N_{IN}^*$ is set for a predetermined period of time after the S range has been selected.

The operation of this second embodiment is described along with a flowchart shown in FIG. 4. This flowchart is similar to the flowchart shown in FIG. 2. Steps 200 to 207 are substantially the same as the corresponding steps 100 to 107 shown in FIG. 2.

In FIG. 4, after step 206, the control proceeds to a step 208 where a flag "D" is set equal to 1. This means that whenever it is judged that the D range is selected at the step 205, this flag "D" is set. At the subsquent step 209, a timer value $T_1$ is set equal to a predetermined timer value $T_0$.

In the subsequent run, if it is judged that the S range is selected, the control proceeds from the step 205 to a step 210 via the step 207. At the step 210, it is judged whether the flag "D" is equal to 1 or not. If the answer to the enquiry at the step 210 is YES, the engine brake control proceeds along steps 211, 212, 213, 214, and 215 until the timer value $T_1$ drops to or below 0 (zero). Upon expiration of the predetermined period of time when the time value $T_1$ becomes zero, the normal S range control proceeds along steps 217, 218, and 219.

At the step 211, a deviation is determined between the sum of a target driver pulley revolution speed $N_{IN}^*$ that is obtained at the step 207 and an increment $\Delta N$ (delta N), and an actual revolution speed $N_{IN}$ obtained by read-in operation at the step 200. This can be expressed by the following equation:

$$e = N_{IN}^* + \Delta N - N_{IN}.$$

Then, at the step 212, a target stepper motor position STEP* is given by calculating the following equation:

STEP*=K$_p$·e +K$_i$∫e.

Then, the control proceeds to the step 213 where the stepper motor drive signal is moved in such a direction as to decrease a difference between the actual stepper motor position and the target stepper motor position STEP* toward zero. At the subsequent step 214, a decrement of the timer value T$_1$ is effected. Then, at the step 215, a judgement is made whether the timer value T$_1$ is less than or equal to zero or not. If the timer value T$_1$ is greater than zero, the control proceeds along the steps 210 to 215 in the next run, and the execution of the engine brake control is repeated. When the timer value T$_1$ becomes less or equal to zero, the control proceeds from the step 215 to the step 216 where the flag "D" is reset to 0 (zero).

After the timer value T$_1$ has decreased and become less than or equal to zero, since the flag "D" is equal to zero, the control proceeds from the step 210 to the step 217 in the subsequent run. Thus, the normal S range control is initiated. At the step 217, a deviation e is given by calculating the following equation:

e =N$_{IN}$*−N$_{IN}$.

Then, at the step 218, a target stepper motor position STEP* is given by the following equation:

STEP*=K$_p$·e+K$_i$∫e.

Then, at the step 219, the stepper motor drive signal is moved in such a direction as to decrease a difference between the actual stepper motor position and the target stepper motor position STEP* toward zero.

FIG. 5 is a diagrammatic time chart showing a change in the target driver pulley revolution speed N$_{IN}$* when there occurs a shift from the D range to the S range. As will be noted from FIG. 5, the target driver pulley revolution speed N$_{IN}$* is increased by an increase ΔN (delta N) during the predetermined period of time indicated by the timer value T$_1$ after occurrence of the shift from the D range to the S range. Thus, the stepper motor 71 is activated to a transmission ratio smaller than a transmission ratio given during the normal S range control, causing a rapid drop in hydraulic pressure within the driver pulley cylinder chamber 20 during a transient period into the engine brake running state. Therefore, sufficiently good engine brake feel is given.

Figure 6:
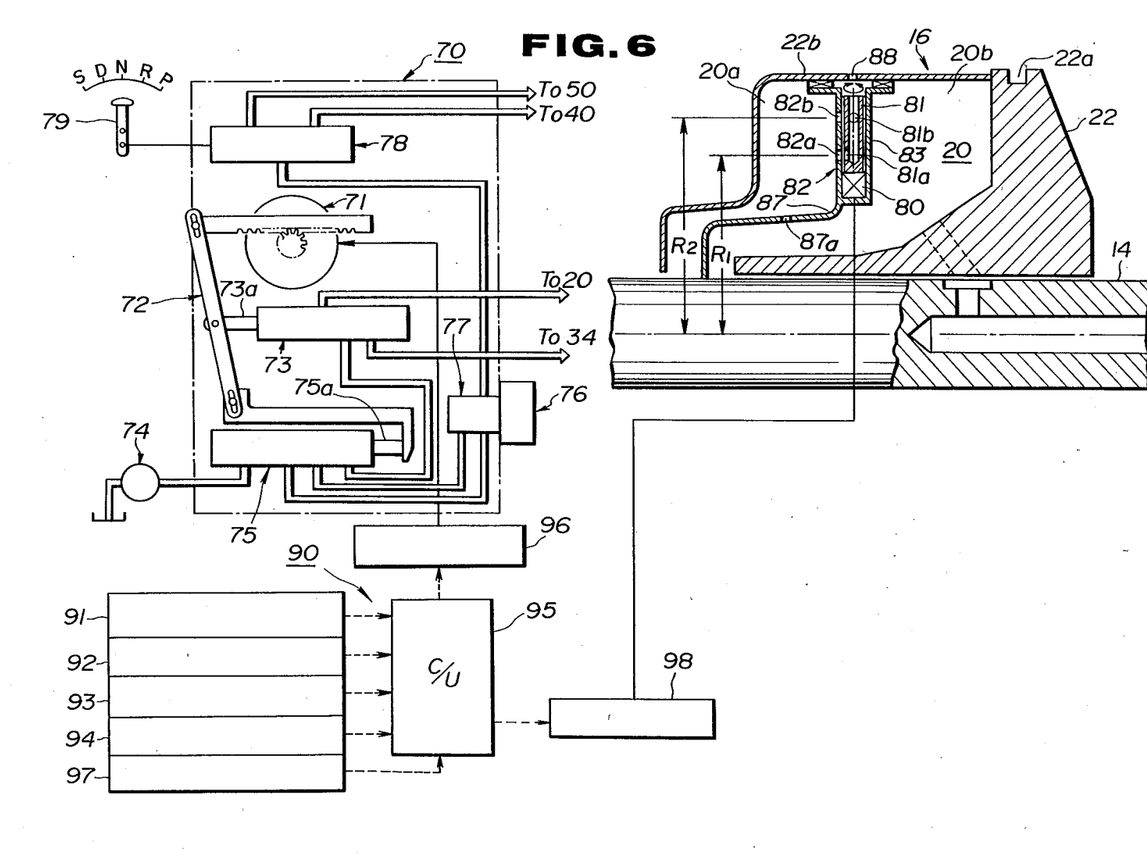
FIG. 6 is a fragmentary section of a driver pulley of a continuously variable transmission illustrated in association with a ratio control system for the continuously variable transmission, showing a embodiment according to the present invention.
Figure 8:
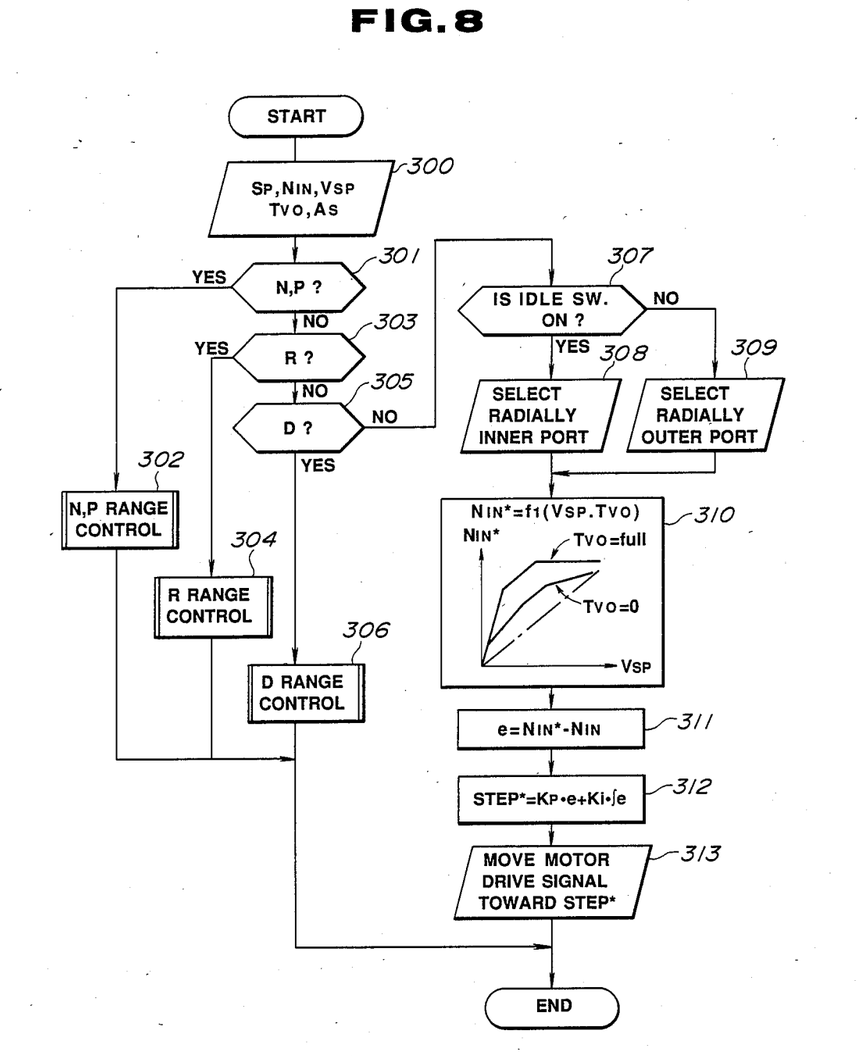
FIG. 8 is a flowchart illustrating processing jobs exceuted in a control unit of the third embodiment.

Referring to FIGS. 6 and 8, the third embodiment is described. This third embodiment is different from the previously described embodiments mainly in the provision of an effective inner diameter selector 82 to vary the effective inner diameter of a hydraulic fluid chamber 20a of a centrifugal force cancel trough. Thus, with the same centrifugal force, the selector 82 can vary the magnitude of force acting on an axially movable conical pulley part 22 in such a direction as to cause the driver pulley 16 to decrease the magnitude of a gripping force which the driver pulley 16 grips a V-belt 24 (see FIG. 1) with.

The chamber 20a of the centrifugal force cancel trough is supplied with hydraulic fluid and thus holds an amount of hydraulic fluid therein, and thus as the driver pulley 16 rotates, the magnitude of force acting on the conical pulley part 22 in a leftward direction as viewed in FIG. 6 increases in response to centrifugal force which the driver pulley 16 is subject to. Under this condition where the driver pulley 16 rotates at a relatively high speed, the hydraulic fluid is thrown radially outwardly and thus disposed in a radially outer portion of the chamber 20a of the centrifugal force cancel trough. The hydraulic fluid is discharged from this chamber 20a via a radially outer drain port 82a when it is opened by the selector 82. When a radially outer drain port 82b is closed and a radially inner drain port 82a is opened by the selector 82, the hydraulic fluid is discharged from this inner drain port 82a so that the amount of hydraulic fluid held in the chamber 20a of the trough increases so that the magnitude of force acting on the movable conical part 22 in the leftward direction as viewed in FIG. 6 increases.

The effective inner diameter selector 82 comprises the radially outer and inner drain ports 82b and 82a which a formed with. That portion of the partition wall 87 which the radially outer and inner drain ports 82b and 82a are formed through defines a part of cylindrical housing 83 fixed to the partition wall 87. The cylindrical housing 83 defines a blind bore having its open end communicating with a drain orifice 88 which a drum 22b fixedly secured to the conical pulley part 22 is formed with. A rotary valve 81 with a rotary solenoid actuator 80 are received in the blind bore of the cylindrical housing 83. The rotary valve 81 is formed with an axial bore having one end closed and the opposite end communicating with the drain orifice 88. Extending radially outwardly from the through bore in two different diametrically displaced directions are two radial connection ports 81b and 81a. When the rotary valve 81 rotates and takes a first predetermined angular position, the connection port 81b is brought into registry with the radially outer drain port 82b, so that hydraulic fluid is discharged via the radially outer drain port 82b, the connection port 81, the axial through bore, and the drain orifice 88. When the rotary valve 81 rotates and takes a second predetermined position as illustrated in FIG. 6, the radially outer drain port 82b is closed, but the connection port 81a is brought into registry with the radially inner drain port 82a, so that hydraulic fluid is discharged via the radially inner drain port 82a, the connection port 81a, the axial through bore, and the drain orifice 88. The partition wall 87 includes a sleeve-like portion which a hydraulic fluid supply orifice 87a is formed with. Supply of hydraulic fluid to and discharge thereof from an adjustable pressure chamber 20b is effected through an axial bore formed through a driver pulley shaft 14.

The rotary solenoid actuator 80 is supplied with an output of a solenoid driver circuit 98. According to this embodiment, the rotary position of the rotary valve 81 is varied in response to the state of an idle switch 97 when a manual selector 79 is placed at a S range position.

Therefore, another difference resides in the provision of the idle switch 97 to supply its output to a control unit 95 and the solenoid driver circuit 98 which receives an output of the control unit 95 to activate the rotary solenoid actuator 80.

The operation of this third embodiment is described along with a flowchart shown in FIG. 8.

In FIG. 8, steps 300 to 306 correspond to the steps 100 to 106 shown in FIG. 2, and steps 310 to 313 correspond to the step 207, 217 to 219 shown in FIG. 4.

At a step 307, a judgement is made whether the idle switch 97 is ON (viz. idle state) or not. If the idle switch 97 is ON, the control proceeds to a step 308 where an output signal is issued to the solenoid driver circuit 98 to cause same to activate the rotary solenoid actuator 80 and thus the rotary valve 81 until the rotary valve 81 takes the second predetermined position where the connection port 81a is brought into registry with the radially inner drain port 82a. In other words, the radially inner drain port 82a is selected and a relatively small effective inner diameter designated by $R_1$ is selected.

If the idle switch 97 is OFF, the control proceeds from the step 307 to a step 309 where the solenoid driver circuit 98 is caused to rotate the rotary solenoid actuator 80 and the rotary valve 81 until the rotary valve 81 takes the first predetermined position where the connection port 81b is brought into registry with the radially outer drain port 82b. Thus, the radially outer drain port 82b and a relatively large effective inner diameter designated by $R_2$ are selected.

After the step 308 or 309, the control proceeds along the steps 310, 311, 312 and 315 to effect so-called normal S range control mentioned before.

From the previous description of the third embodiment, it will now be understood that when the idle switch 97 is turned ON during running with the S range, the effective inner diameter of the chamber 20a is decreased from $R_2$ to $R_1$ so that in addition to the normal S range control, the force due to hydraulic fluid pressure within the chamber 20a increases and this increased force acts on the movable conical pulley part 22 in a direction to cancel the influence of centrifugal force on the hydraulic fluid within the adjustable pressure chamber 20b of the driver pulley cylinder chamber 20. Since, in this manner, the effect of the centrifugal force is cancelled during transient period to engine brake running, a preferred engine brake feel is assured.

Figure 7:
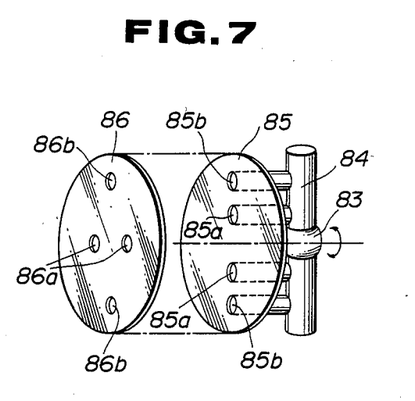
FIG. 7 is a diagram of a rotary disc port selector valve.

FIG. 7 is a diagrammatic exploded view of a modified effective diameter selector.

This modified selector comprises a fixed disc 86 formed with two diametrically opposed radially inner drain ports 86a and two diametrically opposed radially outer drain ports 86b, a rotary disc 85 formed with two radially inner connection ports 85a adapted to be brought into registry with the radially inner drain ports 86a, respectively, and two radially outer connection ports 85b adapted to be brought into registry with the radially outer drain ports 86b, respectively, and a rotary solenoid actuator 83 drivingly connected via a rotary base 84 to the rotary disc 85. It is to be noted that since two radially inner drain ports 86a are arranged in diametrically opposed to each other and equidistant from the axis of rotation as indicated by a one-dot chain line, and the radially outer drain ports 86b are arranged in diametrically opposed to each other and equidistant from the axis of rotation, dislocation of hydraulic fluid in a chamber 20a is prevented.

The present invention has been described along the previously embodiments. However, the present invention is not limited to these embodiments. For example, the steps 217 to 219 of the second embodiment (see FIG. 4) may be replaced with the steps 108 to 121 of the first embodiment (see FIG. 2) or the steps 307 to 313 of the third embodiment (see FIG. 8). According to this modification, effective engine brake drive feel is provided upon selecting the S range or upon releasing the accelerator pedal.

The control strategy may be modified in such a manner as to recognize the initiation of engine brake running when both the S range is selected and the accelerator pedal is released.

What is claimed is:

1. In a continuously variable transmission for a motor vehicle with an engine, comprising:

a driver pulley shaft;

a follower pulley shaft arranged in parallel to said driver pulley shaft;

a driver pulley rotatable with said driver pulley shaft, said driver pulley including a first conical pulley part rotatable with said driver pulley shaft, and a second axially movable conical pulley part defining with said first conical pulley part a first pulley groove, said driver pulley including a driver pulley cylinder chamber, said second axially movable conical pulley part being displaceable in response to hydraulic fluid pressure within said driver pulley cylinder chamber toward said first conical pulley part;

a follower pulley rotatable with said follower pulley shaft, said follower pulley including a third conical pulley part rotatable with said follower pulley shaft, and a fourth axially movable conical pulley part defining with said third conical pulley part a second pulley groove, said follower pulley including a follower pulley cylinder chamber, said fourth axially movable conical pulley part being displaceable in response at least to hydraulic fluid pressure within said follower pulley cylinder chamber toward said third conical pulley part;

a V-belt extending through said first and second pulley grooves and tensioned between said driver and follower pulleys;

said first and second conical pulley parts interposing therebetween said V-belt with a gripping force determined by the hydraulic fluid pressure within said driver pulley cylinder chamber;

an actuator;

means for regulating hydraulic fluid pressure in said driver pulley cylinder chamber in response to a position taken by said actuator, thereby to vary a ratio between said driver and follower pulleys;

means for detecting various kinds of input information and generating output signals indicative of said various kinds of input information;

means receiving said output signals for adjusting the magnitude of said gripping force in response to said output signals of said detecting means, said adjusting means including means for activating said actuator in response to said output signals, means for detecting a demand for an engine brake running of the motor vehicle, and means for effecting a reduction in magnitude of said gripping force upon detecting said demand for the engine brake running of the motor vehicle.

2. A continuously variable transmission as claimed in claim 1, wherein said various kinds of input information detecting means include a select position sensor generating a select position indicative signal indicative of a range position selected, a driver pulley revolution speed sensor generating a driver pulley revolution speed indicative signal, a vehicle speed sensor generating a vehicle speed indicative signal, and a throttle opening degree sensor generating a throttle opening degree indicative signal.

3. A continuously variable transmission as claimed in claim 2, wherein said demand for the engine brake running is detected when said select position indicative signal indicates a predetermined range position and said throttle opening degree is less than a predetermined value.

4. A continuously variable transmission as claimed in claim 2, wherein said demand for the engine brake running is detected when said select position indicative signal indicates a predetermined range position, and said reduction effecting means keeps said reduction in the magnitude of said gripping force for a predetermined period of time after detecting said demand for the engine brake running.

5. A continuously variable transmission as claimed in claim 1, wherein said driver pulley includes a centrifugal force cancel trough supplied with hydraulic fluid subject to centrifugal force during rotation of said driver pulley, and said adjusting means include means for varying effective inner diameter of said centrifugal force cancel trough upon detecting said demand for the engine brake running.

6. A continuously variable transmission as claimed in claim 5, wherein said various kinds of input information detecting means include a select position sensor generating a select position indicative signal indicative of a range position selected, a driver pulley revolution speed sensor generating a driver pulley revolution speed indicative signal, a vehicle speed sensor generating a vehicle speed indicative signal, a throttle valve, a throttle opening degree sensor generating a throttle opening degree indicative signal, and an idle switch which is closed when the throttle valve takes the idle speed position.

7. A continuously variable transmission as claimed in claim 6, wherein said demand for the engine brake running is detected when said select position indicative signal indicates a predetermined range position and said idle switch is closed.

* * * * *